June 4, 1968  J. HARRISON  3,386,563
MACHINE FOR THE SORTATION OF MAIL AND OTHER PACKAGES
Filed Dec. 19, 1966  4 Sheets-Sheet 1
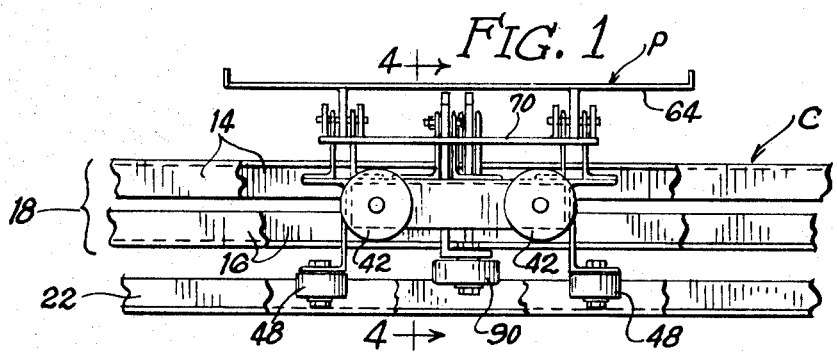
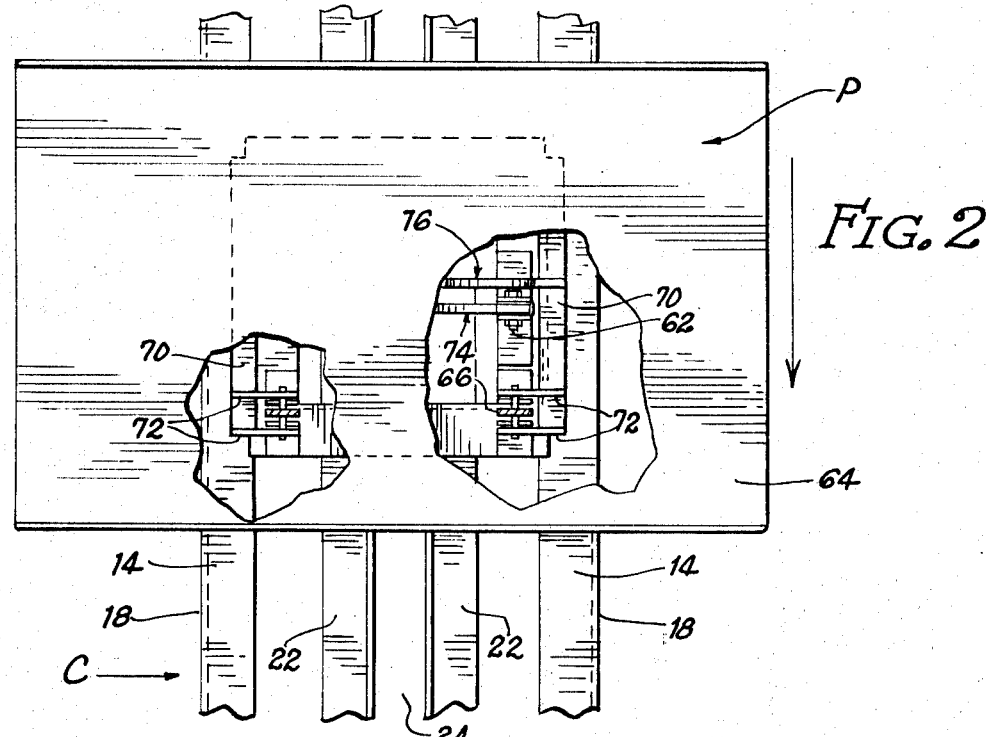
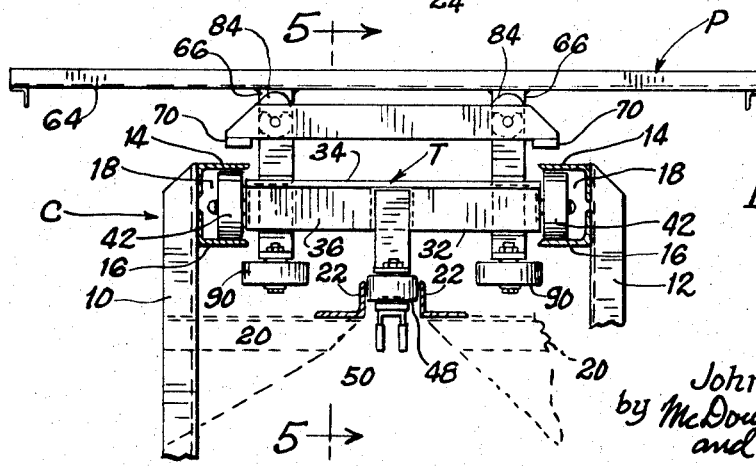
INVENTOR
John Harrison
by McDougall, Hersh, Scott
and Ladd Attys

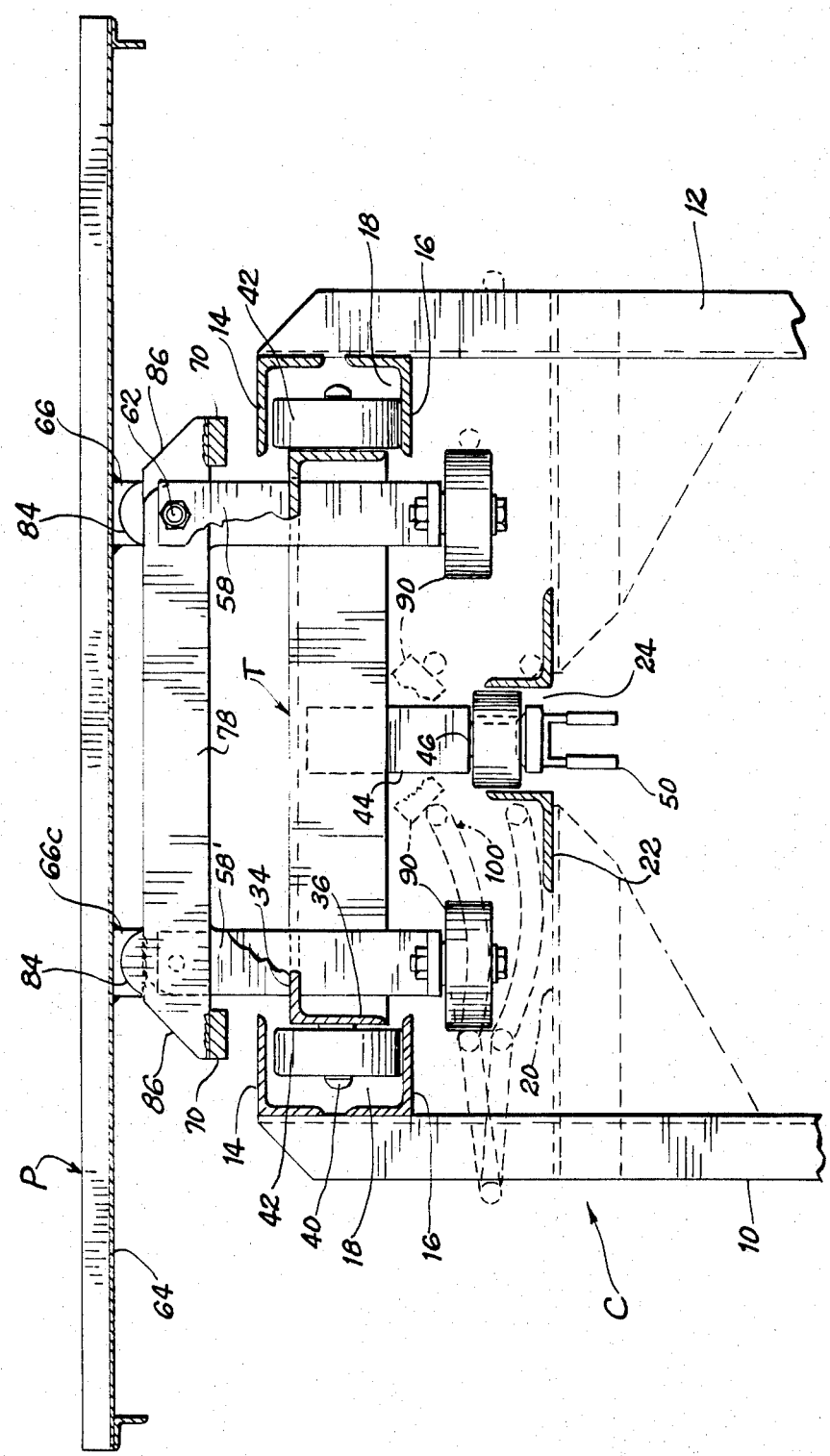

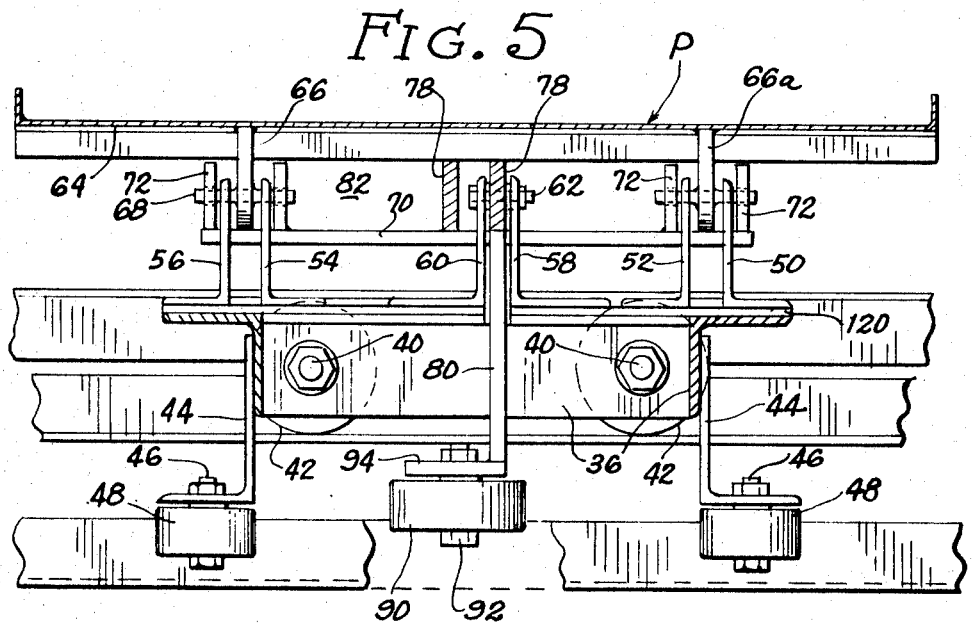
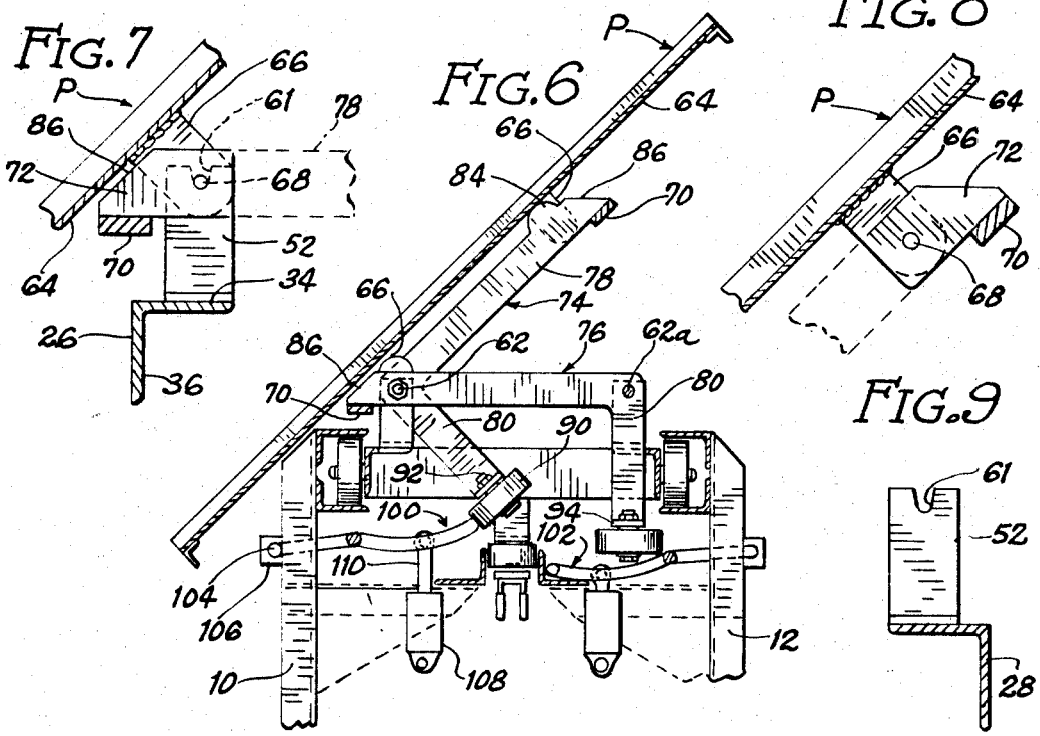

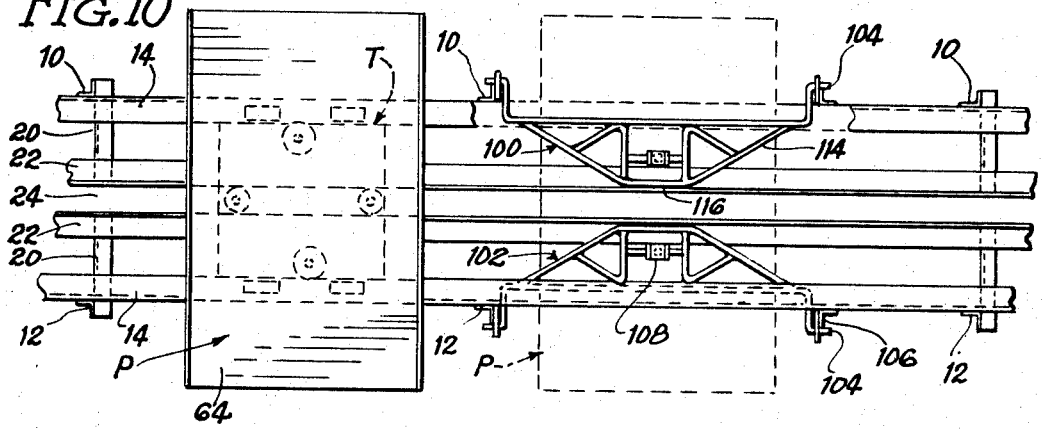
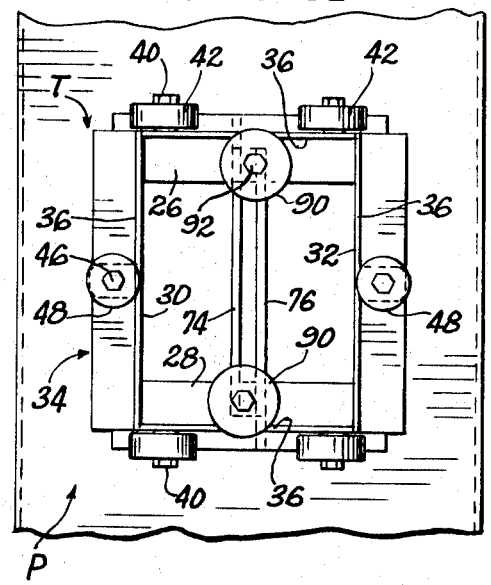
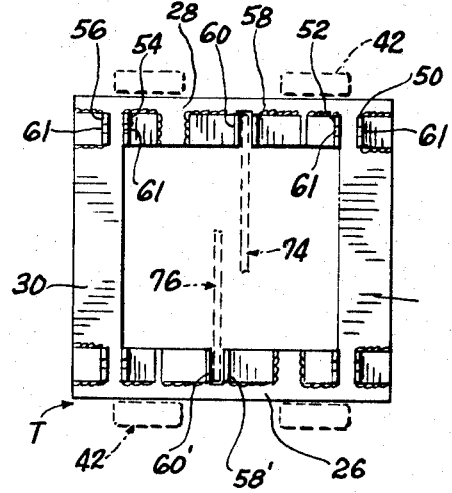
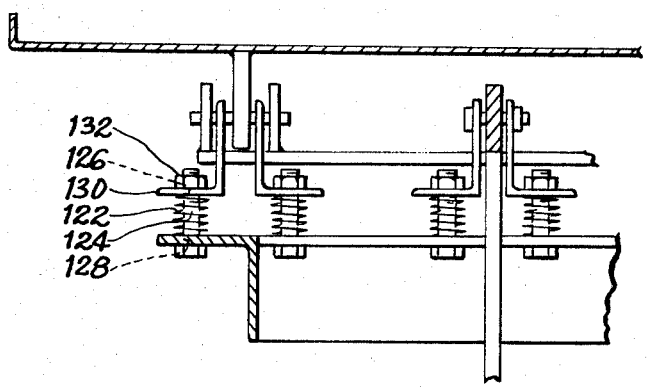

United States Patent Office 3,386,563
Patented June 4, 1968

3,386,563
MACHINE FOR THE SORTATION OF
MAIL AND OTHER PACKAGES
John Harrison, Lincolnwood, Ill., assignor to The Spra-Con Company, Chicago, Ill., a corporation of Illinois
Filed Dec. 19, 1966, Ser. No. 602,810
15 Claims. (Cl. 198—155)

ABSTRACT OF THE DISCLOSURE

The invention is addressed to an endless conveyor having a plurality of trucks transported therewith on which trays are mounted for rocking movement in either direction crosswise of the truck to tilt the trays for delivery of the mail or packages to selected stations. The improvement resides in the construction and mounting of the trays on the trucks whereby the trays are supported at their corner portions in position of rest and whereby the trays are tilted responsive to actuation means and shiftable into and out of operative position and whereby the tilting movement of the tray occurs about axes adjacent the lateral edges of the tray for minimizing the portion of the tray extending below the axis when in tilted position and to locate the center of gravity of the tray inwardly of the axis continuously to return the tray to the position of rest. The mounting of the tray on the supporting truck is in a manner which enables lifting of the tray from the truck for replacement or repair and which provides for a low silhouette to minimize the head room required for the sortation machine.

---

This invention relates to a machine for sortation of various articles such as mail, bags of mail, packages and the like for separation and transportation to pre-selected areas arranged alongside the sortation machine.

In the previously issued Patent No. 3,231,066, description is made of a sortation machine of the type described in the form of an endless conveyor having a plurality of platforms or trays arranged in end to end alignment for deposition of mail, mail bags, packages or articles on the surfaces of the trays with means along the length of the conveyor operative selectively to rock the platforms or trays to tip the trays to one side or the other for delivery of the article on the surface thereof. Thus, when the articles are deposited on the tray or platform, the machine is keyed to tip the tray at a predetermined location along the length of the conveyor for delivery of the article to the proper receptacle in sortation.

Commercial operation of sorting machines of the type described has indicated a number of deficiencies which are intended to be overcome by the concepts of this invention, especially in the construction of the tray and its support for operation between tilted position and position of rest.

In the prior construction and operation, the trays have been supported for tilting movement in either crosswise direction on a single pivot pin mounted between suitable bracket members on the movable truck. Thus the shock which is imposed when the bag or article is loaded onto the tray is transmitted first to the pivot pin before it is distributed by the truck to the supporting wheels. Even when the pivot pin is constructed of relatively large cross-section and of high strength steel, the intermittent shock soon leads to wear and pin distortion with the result that replacement or repair is often required thereby to cause excessive shutdown of the sortation machine.

Another problem often encountered in the operation of sortation systems of the type described, where the pivot for the tilting trays is at the center of the tray, is the amount of overlap that exists when the tray is in tilted position. By this is meant the length of tray which extends downwardly below the normal level of the tray and into the path of the mail bags on adjacent trays, when in tilted position. When such bags being delivered by adjacent trays are engaged by the portion extending downwardly from the tilted tray during displacement by the fast moving conveyor, the tray often cuts the bag and either destroys or disfigures the contents thereof and/or jams the equipment to cause further shutdown and delay.

While not pertinent to the operation of the sortation system, the prior constructions and operation lack in resiliency and in quietness whereby the noise level and wear is excessive.

It is an object of this invention to produce a new and improved sortation system of the type described which overcomes many of the deficiencies of the prior constructions, which provides for uniform and substantially immediate distribution of shock upon loading of the trays; which minimizes the amount of projection of tilted trays into the path of bags delivered or being delivered by adjacent trays; which is sturdy in construction and quiet in operation; which is formed of relatively few simple parts arranged to provide improved operation between tilted and position of rest; which provides for a lower silhouette thereby to require less head room for the sortation machine, and in which the tray system is subject to less wear and breakage and less jamming during operation of the machine whereby the amount of shutdown is greatly reduced thereby to increase the output from the machine.

These and other objects and advantages of this invention will hereinafter appear and for purposes of illustration, but not of limitation, an embodiment of the invention is shown in the accompanying drawings, in which—

FIG. 1 is a side elevational view of the tiltable tray and supporting assembly embodying the features of this invention, with portions broken away for better illustration of the interior elements thereof;

FIG. 2 is a top plan view of the assembly shown in FIG. 1 with portions of the tray broken away to show the underlying elements;

FIG. 3 is an end elevational view of the tray assembly shown in FIG. 1;

FIG. 4 is an enlarged sectional elevational view of the tray assembly taken on line 4—4 of FIG. 1 embodying the features of this invention;

FIG. 5 is a side sectional elevational view taken on line 5—5 of FIG. 3 similar to that of FIG. 1;

FIG. 6 is a sectional elevational view similar to that of FIG. 4 showing the arrangement of elements when the tray is in tilted position and the camming means thereof;

FIG. 7 is a sectional elevational view of a lateral support for the tray in tilted position;

FIG. 8 is a sectional elevational view of the support element at the opposite end of the tray when in tilted position;

FIG. 9 is a sectional elevational view of a supporting upright on the truck frame;

FIG. 10 is a top plan view of a section of a length of the conveyor illustrating an oncoming tray, and tilting means;

FIG. 11 is a view from the bottom side of the tray and truck;

FIG. 12 is a top view of the truck frame separate and apart from the supported tray; and FIG. 13 is an elevational view of a portion of the support members for the tray showing a modification in a resilient support.

The sortation machine embodying the features of this invention comprises a conveyor portion in the form of an endless carousel, a plurality of trucks guided for movement on said conveyor portion, and a tiltable tray supported on each truck for rocking movement relative to the truck about lengthwise disposed laterally spaced apart pivots for tilting the tray to one side or other of the conveyor supported truck.

As shown in the drawings, the conveyor portion C comprises a stationary framework including a plurality of vertically disposed laterally spaced apart uprights 10 and 12. The uprights are interconnected lengthwise by elongate, facing upper and lower L-shaped bars 14 and 16 which define inwardly facing guide slots or rails 18 therebetween which extend continuously about the conveyor frame with the guide rail on one side facing the guide rail on the other side at the same horizontal level.

Also extending inwardly from each conveyor upright 10 and 12 but for a distance less than one-half the distance between the laterally spaced uprights and below the level of the guide rails 18 are rigid structural members 20 on which elongate steel beams 22 of L-shaped are fixed to provide a vertically disposed guide slot 24, which is open at the top and bottom and which also extends continuously throughout the path of the conveyor.

Each truck T comprises a rigid rectangularly shaped member formed of crosswise extending longitudinally spaced apart structural members 26 and 28, preferably of L-shape, and laterally spaced apart longitudinally extending structural members 30 and 32 which are also preferably in the form of L-shaped members joined one to the other at their ends to define a box-like section having a horizontally disposed upper surface 34 and depending skirts 36 with the longitudinally extending members 26 and 28 being laterally spaced apart by an amount less than the spaced relationship between the uprights 10 and 12 and the guide rails 18 on the upper end portions thereof.

Shafts or axles 40 extend laterally outwardly from the forward and rearward end portions of the longitudinally extending laterally spaced apart truck frame members 26 and 28 and wheels 42 are rotatably mounted on the outwardly extending portions of the axles with the wheels laterally spaced by an amount corresponding to the spaced relationship between the guide rails and dimensioned to be received within the guide slot whereby the wheels 42 ride on the guide rails to support the truck frame for translatory movement along the conveyor.

Depending from the forward and rearward crosswise members 30 and 32, midway between the ends thereof, are a pair of arms 44 having lower end portions turned horizontally that support vertically disposed shafts 46 on which rollers 48 are mounted for free rotational movement about the vertical axis with the arms being dimensioned to position the rollers 48 within the guide slot 24 between the stationary frame members 22 to guide the truck during translatory movement along the conveyor.

A bracket, fixed to the lower end portion of each of the arms 44, depends downwardly through the guide slot to a level below the roller 48 and the bracket embodies linking pins 50 for connection with an endless driven chain (not shown) of the conveyor whereby the translatory movement is imparted to the truck for lengthwise displacement in one direction along the conveyor. The trucks are connected to the driving chain in the desired longitudinally spaced apart relation whereby the spaced relationship is maintained between the trucks during translatory movement about the carousel.

The platform or tray P is illustrated in the drawing as a flat plate having a crosswise dimension, usually greater than the spaced relationship between the uprights 10 and 12 of the frame section, to extend beyond the uprights, and a lengthwise dimension which is usually greater than the corresponding dimension of the truck frame. The platform P can be provided with upturned portions along the forward and rearward edge for confinement of the article supported thereon but with the lateral edges being free to enable the article to slide laterally over the surface of the tray for displacement therefrom. It will be understood that the platform or tray can be in the form of a slat, pan or receptacle of other shape but preferably without obstructions in the lateral edge portions to enable the article deposited on its top surface to slide laterally from the tray in one direction or the other in response to the tilting of the tray.

Means are provided on the bottom side of the tray and on the top side of the truck frame for interconnection to support the tray at a plurality of points, preferably at its corner portions for balanced support, when in normal position of rest, whereby load and the shock of loading is immediately distributed to the widely spaced apart supports while still enabling the tray to be rocked relative to the supports in one direction or the other laterally of the truck while still being supported thereby and which also enables the tray merely to be lifted off of or onto the truck frame for replacement, removal or repair.

For this purpose, the top side of the truck frame making up the lengthwise extending laterally spaced apart members 26 and 28 are each provided with a pair of angle brackets at the leading end portion, at the trailing end portion and at about the center of the truck frame to provide a pair of longitudinally spaced apart uprights 50 and 52 at the leading edge of the truck frame, a pair of longitudinally spaced apart uprights 54 and 56 at the trailing edge portion of the frame, and another pair of longitudinally spaced apart uprights 58 and 60 at about the center of the truck frame, on both sides of the frame. Each of the pairs of uprights in the leading and trailing edge portions of the truck frame are provided with longitudinally aligned recesses 61 extending downwardly from the upper edge to define aligned grooves therebetween adapted to receive portions, hereinafter to be described, depending upon the underside of the tray for balanced support of the tray in the widely spaced apart points.

The longitudinally spaced uprights 58 and 60 at the center on one side of the truck frame are offset from the pair of longitudinally spaced uprights 58' and 60' on the other side and each of the pairs of uprights 58, 60 and 58', 60' is formed with longitudinally aligned openings adjacent the upper ends through which pins 62 extend with nut members threaded onto the through-extending portions to mount the pins between the uprights for rotational movement of the pins about their respective axes.

The tray or platform has a horizontally disposed bottom wall 64 with means depending therefrom pivotally to mount the tray on the truck frame and to support the tray at balanced widely spaced apart points on the truck frame. For this purpose, a bracket arm 66 depends from the bottom side of the tray in vertical alignment with the space between each of the pairs of longitudinally spaced apart uprights 50, 52, 54 and 56 at the leading end portion and the trailing end portion of the truck frame thereby to provide for the same longitudinally spaced apart and cross-wise spaced apart relationship between the arms 66, 66ª, 66ᵇ and 66ᶜ. Each arm is fixed at its upper end, as by welding, to the bottom side of the tray and a spindle 68 is secured to the lower end portion of each arm in longitudinal alignment with the aligned recesses 61 in the upper ends of the uprights with the spindles extending lengthwise from opposite sides of the arms for receipt in the recesses with the arm 66 located between the uprights in position of rest.

A longitudinally extending shelf plate 70 is disposed on opposite sides of the tray in spaced relationship with the underside thereof and outwardly of the arms 66 to clear the uprights on the truck frame. The shelf plate is removably secured to the tray by means of bracket arms 72 which are removably secured on the spindles outwardly of the portions in vertical alignment with the uprights, with the shelf plates 70 being secured to the lower outwardly extending end portions of the longitudinally aligned bracket arms 72.

Thus the tray can be lowered onto the truck frame merely by dropping the spindles for entrance into the upwardly facing recesses 61 in the ends of the truck frame uprights 50, 52, 54 and 56, to support the tray in position of rest at the four corner sections.

The tray is adapted to be rocked from the described position of rest to tilted position with the spindles 66 operating in the respective grooves 61 on one side of the truck frame as the pivotal axis while the spindles 68 on the opposite side are lifted from their respective grooves. The actuators for selectively tilting the tray about one or the other of its pair of axes for rocking the tray to tilted position comprise a pair of bell crank levers 74 and 76 arranged in side by side relationship with one bell crank lever 74 pivoted at its angle on the pivot pin 62 on one side of the truck frame while the other bell crank lever is pivoted at its angle on the pivot pin 62a on the other side of the truck frame. One arm 78 of each bell crank lever extends crosswise beneath the tray towards the opposite side while the other arm 80 of each bell crank lever depends downwardly from the pivot.

Each of the upper arms 78 of the bell crank levers are dimensioned to have a length to extend into the space 82 between the shelf plate 70 and the bottom side 64 of the tray for confinement therebetween with a projection 84 extending upwardly from the end portion of each arm 78 into engagement with the bottom side of the tray and with a downwardly tapered upper edge portion 86 to enable the tray to be rocked relative thereto, as illustrated in FIG. 7.

Mounted on the lower end portion of each arm 80 of the bell crank levers for rotational movement about a vertical axis is a roller 90 rotatably supported upon a spindle 92 fixed to a horizontally disposed end portion 94 on the lower end of the lever arms.

Means are provided for movement into and out of the path of the rollers 90, between operative and inoperative or normal positions, to effect displacement of the rollers laterally inwardly when in operative position and to be out of the path of the rollers when in inoperative position. In the illustrated modification, such means comprises a pair of cam members 100 and 102 arranged in crosswise alignment at each station wherein the tray is adapted to be tilted to one side or the other for delivery of articles thereon to suitable chutes or receptacles. The cam members or arms 100 and 102 are provided with end portions 104 rotatably received in suitable brackets 106 fixed to the conveyor frame to enable rocking movement of the cam members between raised or operative position and lowered or inoperative position with means, such as an air cylinder 108, for each cam member with the end of the piston rod 110 pivotally connected to an offset portion of the member while the base of the air cylinder is pivotally connected to a portion of the frame (not shown) for rocking movement of the cam member between operative and inoperative position.

The cam member is formed with a leading cam edge 112 which is tapered to extend gradually inwardly and a trailing cam edge 114 which returns gradually outwardly and with a longitudinally extending, flattened central portion 116 in between. When in raised position, as illustrated by the solid lines to the left in FIG. 6, the edge of the cam member lies in the path of travel of the roller 90 to effect lateral displacement of the roller as the truck is advanced longitudinally along the conveyor. Lateral displacement of the roller effects rocking movement of the bell crank lever 80 about its pivot 62 whereby the other arm 78 in engagement with the bottom side of the tray operates to lift the tray for rocking movement about its axis on the same side of the truck frame to tilt the tray in that direction. Maximum tilt is achieved as the roller rides off of the cam edge portion 112 onto the innermost flattened portion 116 and the tray is held in tilted position as the roller continues to ride over the flattened central portion 116.

When raised from its position of rest, the center of gravity of the tray remains inside the pivotal axis so that the tray is constantly urged by its own weight to rock downwardly about its pivot to rest position. Thus, as the roller 90 rides off of the flattened central portion 116 onto the receding cam portion 114, the tray is gradually let down for return to rest position.

It will be apparent that other means may be employed selectively to be displaced into and out of the path of the rollers 90 to effect lateral displacement thereof as well as other means operative selectively to displace such actuating means into and out of position to be engaged by the rollers.

In practice, the pivot 62 for the bell crank lever 80 is located in longitudinal alignment with the grooves 61 in the uprights 50, 52, 54 and 56 so that the spindles 68 will operate in substantially a common axis with the pivot pin 62.

In operation, the trays are normally in position of rest to lie horizontally on their multiple supports in the corner portions of the truck frame. The trucks are connected in the desired longitudinally space apart relation to the endless driving chain of the conveyor whereby the truck frame is displaced longitudinally about the conveyor with the weight of the truck carried by the rollers 42 riding on the guide rails 18.

When it is desired to deliver the package carried on the surface of the tray, the necessary signal is transmitted to the appropriate air cylinder 108 for operation of the desired cam track alongside the station of delivery. Thus the cam track is rocked from inoperative position, out of the path of the tilting rollers 90, into operative position, into the path of the tilting rollers. As the truck continues to move along the conveyor, the tilting roller 90 comes into engagement with the raised cam track 100, as illustrated in FIG. 6, to cam the roller for inward displacement as the roller rides over the leading portion 112 of the cam track. This causes the arm supporting the roller to rock about its pivot and engage the underside of the tray to tilt the tray about the pivot pins resting in the groove 61 along the same side of the truck. As the tray is raised to tilted position, the package slides laterally from the tilted tray for delivery to the station alongside the conveyor. Continued travel of the truck with the conveyor chain brings the tilt roller into engagement with the receding cam surface 114 of the cam track to enable the tray slowly to return to lowered position of rest on the truck supports with the spindles resting in the slots 61.

Only one or the other of the pairs of cam tracks is adapted to be in operative position at any one time. If the other cam track is displaced by the air cylinder to operative position, the reaction will be the same as that previously described except that the opposite bell crank lever will be rocked to lift the tray off of the opposite supports for rocking movement towards the opposite side about the pivots.

It will be seen that the tray merely rests on the spaced supports and can easily be lifted therefrom for replacement or repair.

It will be apparent also that instead of pivoting the tray at its center for tilting movement about a central axis, the trays are tilted about axes alongside the lateral edges of the supporting truck frame whereby the portion of the trays extending below the pivot into the path of adjacent bags or packages will be considerably less thereby to minimize tearing of the bags or jamming of the machine during operation.

By way of modification, the impact can be cushioned and the noise level greatly reduced when the uprights are resiliently supported or otherwise cushioned in their connection to the truck frame. As illustrated in FIG. 5, spacers or pads 120 of rubber, plastic or other elastic or cushioning material can be disposed between the base of the uprights 50, 52, 58 and 60 and the frame members 26 and 28 on which they are mounted.

In the preferred arrangement shown in FIG. 13, spring members 122 are telescoped about the portions of the elongate bolts 124 extending vertically through aligned openings 126 and 128 in the horizontally disposed flanged portion 130 of the uprights and the truck frame members 26 and 28, with one end of each spring member bearing against the bottom side of the flanged portion of the upright and the top side of the truck frame member with the bolt being dimensioned to have a length greater than the combined thickness of the flange 130 and the truck frame member 26 or 28 resiliently to support the uprights in spaced relationship with the truck frame. Nut members 132 are threaded onto the through-extending portions of the elongate bolt 124 to function as stops for the uprights in raised position. Thus the uprights and the supported tray float on the truck frame thereby to minimize the tranmission of noise and resiliently to support the loaded tray without interfering with the flexibility in operation and use and without inhibiting the freedom for tilting movement in one direction or the other.

While it is preferred to align the pivotal axes for the actuating levers with the axes of the laterally spaced apart pivotal supports for the tray, it will be understood that the desired tilting movement of the trays can be effected when the pivots for the actuating levers are offset from the axes of the pivotal supports for the trays. Instead of actuating levers of the type described, other means for imparting rocking movement of the trays about their pivots may be employed, it being essential only to provide for applying an upward force onto the bottom side of the trays offset from the center of gravity of the trays in the direction away from the supports about which the tray is to be pivoted.

It will be apparent from the foregoing that a simple and efficient construction is provided in the tray support whereby the tray can be easily and quickly removed from the supporting truck frame; whereby the tray is supported at widely spaced apart portions for more effective distribution of load and impact; and whereby the tray is tilted about axes offset in the direction of tilt so that a minimum length of tray will depend beyond the axis in position to interfere or to engage articles deposited by adjacent trays.

It will be understood that changes may be made in the details of construction, arrangement and operation without departing from the spirit of the invention, especially as defined in the following claims.

I claim:

1. In a sortation device having an elongate conveyor track, a truck frame mounted for longitudinal movement along the conveyor track, means forming a part of the conveyor track for imparting translatory movement of the truck frame, a tray on each conveyor truck frame mounted for tilting movement to at least one side for delivery of articles on the tray when raised to tilted position, actuating means along the conveyor track mounted for movement into and out of operative position to effect actuation of the tray to tilted position when in operative position, the improvement in which the tray is supported on the truck frame at a plurality of spaced portions, when in position of rest, and for tilting movement about an axis offset from the center of the truck frame towards the side to which the tray is tilted in tilted position comprising bracket members extending upwardly from the top side of the truck frame in longitudinally spaced apart relation with one set of bracket members offset laterally to one side of the center of the truck frame and another set of brackets offset to the opposite side of the center of the truck frame, abutments depending from corresponding portions of the underside of the tray in pivotal engagement with said bracket members and separable therefrom, and lever means mounted for pivotal movement on said truck frame about an axis substantially aligned with the axis of pivotal support between said bracket members and abutments along the side of the tray in the direction of tilting movement with one arm of said lever extending downwardly from the pivot and another arm extending laterally beneath the tray whereby the tray will be lifted for rocking movement about its pivot in response to displacement of the depending arm for rocking movement about its pivot, and in which said actuating means comprises a cam member mounted to extend into and out of the path of said depending arm for displacement thereof when in operative position and which extends out of the path of said arm when in inoperative position.

2. In a sortation device having an elongate conveyor track, a truck frame mounted for longitudinal movement along the conveyor track, means forming a part of the conveyor for imparting translatory movement to the truck frame along the conveyor track, a tray on the truck frame mounted for tilting movement to opposite sides for delivery of articles on the tray when raised to tilted position, actuating means along the conveyor track mounted for movement into and out of operative position to effect movement of the tray to tilted position when in operative position, the improvement in which the tray is supported on the truck frame at a number of spaced points when in normal position of rest and for tilting movement about laterally spaced apart separate axes for tilting to either side comprising a laterally spaced apart pair of longitudinally spaced apart brackets extending upwardly from the top side of the truck frame, abutments extending downwardly from corresponding portions of the bottom side of the tray into releasable, pivotal engagement with said brackets for support of the tray on the brackets when in position of rest and for pivotal movement about longitudinally spaced apart aligned brackets of the pair, a pair of lever members in which one of said lever members is mounted for pivotal movement on said truck frame about an axis substantially aligned longitudinally with the axis of one of the brackets of the pair while the other lever member is mounted for pivotal movement about an axis substantially aligned with the axis of the other of the longitudinally aligned brackets of the pair with each lever member having an arm extending downwardly from the pivot and another arm extending crosswise beneath the tray whereby the tray will be lifted from one of the brackets of the pair for rocking movement about the axis of the other bracket of the pair in response to rocking movement of the corresponding lever member and in which said actuating means comprises a cam section on opposite sides of the conveyor truck having a cam edge which extends into the path of the depending arm for displacement thereof when in operative position and which remains out of the path of said arm when in inoperative position.

3. A sortation device as claimed in claim 2 in which the truck frame is open intermediate the lateral edges to enable the depending arm from the lever members to extend downwardly therethrough and to be displaced laterally relative thereto.

4. A sortation device as claimed in claim 2 in which the center of gravity of the tray between tilted position and position of rest is between the laterally spaced apart pivotal axes whereby the tray is constantly urged by its own weight to return to position of rest on the brackets.

5. A sortation device as claimed in claim 1 in which the bracket members have longitudinal recesses extending downwardly from their upper edges and in which the abutments extending downwardly from the tray include longitudinally extending horizontally disposed spindles dimensioned to be received in pivotal engagement in said recesses.

6. A sortation device as claimed in claim 2 which includes laterally spaced apart bracket plates secured in spaced relation to the side of the tray and in which the lever arms extending crosswise beneath the tray are dimensioned to extend into the space between the opposite bracket plates and the tray.

7. A sortation device as claimed in claim 2 in which the brackets are located adjacent the lateral edge portions of the truck frame.

8. A sortation device as claimed in claim 2 in which the brackets are located adjacent the leading and trailing edge portions of the truck frame.

9. A sortation device as claimed in claim 2 which includes a roller mounted for free rotational movement about a vertical axis on the lower end portion of the depending arm of the lever members for roller engagement with the cam actuator when in operative position.

10. A sortation device as claimed in claim 2 in which the lever members are longitudinally spaced one from the other.

11. A sortation device as claimed in claim 2 which includes means for guiding the truck frame about the conveyor track.

12. A sortation device as claimed in claim 1 which includes a plurality of truck frames and at least in longitudinally spaced apart relation along the conveyor track.

13. A sortation device as claimed in claim 2 in which the brackets are resiliently supported on the truck frame.

14. A sortation device as claimed in claim 13 in which the brackets comprise a horizontal portion and a vertical portion and in which the means for resiliently mounting the brackets on the truck frame comprise vertically aligned openings in the horizontally disposed portions of the brackets and the truck frame, a connecting rod extending through the aligned openings with stops on the ends of the rods projecting beyond the openings having a spaced relationship greater than the combined thickness of the bracket portion and truck frame and a resilient member interposed between said horizontally disposed portion of the bracket and the truck frame constantly to urge the bracket in the direction away from the truck frame towards the limit of the stops.

15. In a sortation device having an elongate conveyor track, truck frames mounted for longitudinal movement along the track, means forming a part of the conveyor for imparting translatory movement to the truck frames along the conveyor track, a tray on each truck frame mounted for tilting movement to opposite sides for delivery of articles on the tray when the tray is raised to tilted position, the improvement comprising actuating arm means mounted with each truck frame for movement between raised and lowered positions, a tray of substantially rectangular shape for each truck frame having a top side and a bottom side, a plurality of abutments extending downwardly from the bottom side of each tray with the abutments arranged along the opposite lateral edge portions of the tray and longitudinally aligned in spaced apart relation along said edge portions to define horizontally disposed laterally spaced apart axes for rocking movement of the tray between tilted and normal position, brackets extending upwardly from the top side of the truck frame corresponding in number and arrangement with the said abutments, said abutments being at rest on said brackets for support of the tray along the lateral edge portions immediately above the path of travel of the actuating arm during movement from lowered to raised positions with one actuating arm means in position to engage the underside along one lateral edge portion of the tray and another actuating arm means in position to engage the underside of the other lateral edge portion of the tray when actuated from lowered to raised positions to lift the abutments from the brackets along said lateral edge portion while pivoting the tray about the aligned brackets and abutments along the other lateral edge portion of the tray to tilt the tray about said brackets and abutments as the pivotal axis.

References Cited

UNITED STATES PATENTS 3,000,518    9/1961    Baumann _____ 214—11

RICHARD E. AEGERTER, *Primary Examiner.*